United States Patent
Nowakowski et al.

(10) Patent No.: US 10,518,721 B1
(45) Date of Patent: Dec. 31, 2019

(54) NO-DRILL, NO-ADHESIVE LICENSE PLATE MOUNTING BRACKET

(71) Applicants: Chad Louis Nowakowski, Lakewood, CO (US); Cristi Michelle Nowakowski, Lakewood, CO (US)

(72) Inventors: Chad Louis Nowakowski, Lakewood, CO (US); Cristi Michelle Nowakowski, Lakewood, CO (US)

( * ) Notice: Subject to any disclaimer, the term of this patent is extended or adjusted under 35 U.S.C. 154(b) by 0 days.

(21) Appl. No.: 16/542,211

(22) Filed: Aug. 15, 2019

Related U.S. Application Data

(60) Provisional application No. 62/725,659, filed on Aug. 31, 2018.

(51) Int. Cl.
| | | |
|---|---|---|
| *B60R 13/10* | (2006.01) | |
| *G09F 7/18* | (2006.01) | |
| *G09F 21/04* | (2006.01) | |

(52) U.S. Cl.
CPC .............. *B60R 13/105* (2013.01); *G09F 7/18* (2013.01); *G09F 21/048* (2013.01); *G09F 2007/1843* (2013.01); *G09F 2007/1865* (2013.01); *G09F 2007/1895* (2013.01)

(58) Field of Classification Search
CPC . B60R 13/105; G09F 7/18; G09F 2007/1843; G09F 2007/1865; G09F 2007/1895
See application file for complete search history.

(56) References Cited

U.S. PATENT DOCUMENTS

| | | | | |
|---|---|---|---|---|
| 3,509,653 A | * | 5/1970 | Hummel | G09F 21/04 40/591 |
| 5,813,640 A | * | 9/1998 | Koch | G09F 7/18 248/222.11 |
| 6,167,645 B1 | * | 1/2001 | Gasko | B60R 13/105 293/115 |
| 7,752,785 B2 | * | 7/2010 | Beer | B60R 13/105 24/DIG. 57 |
| 9,725,052 B1 | * | 8/2017 | Honaker | B60R 13/105 |
| 2003/0196355 A1 | * | 10/2003 | Castro | B60R 13/105 40/209 |
| 2005/0017141 A1 | * | 1/2005 | Glickman | B60R 13/105 248/220.41 |
| 2006/0090380 A1 | * | 5/2006 | Zander | B60R 13/105 40/200 |
| 2013/0270316 A1 | * | 10/2013 | Angara | B60R 13/105 224/510 |

(Continued)

*Primary Examiner* — Gary C Hoge
(74) *Attorney, Agent, or Firm* — Quickpatents, LLC; Kevin Prince

(57) ABSTRACT

A bracket for holding a license plate to a vehicle having an air grille with vertical posts comprises a license plate frame. Two leg member are each fixed with a lower edge of the frame and terminate with an elongated foot that has a distal end that engages one of the vertical posts. The leg members each include an elongated arm that has a proximal end rotatably fixed with the leg member and a distal end that has a lateral slot for receiving the vertical post therein. During installation, the foot and the arm of the leg members are inserted into the air intake grille to engage one of the vertical posts, and the arm thereafter is rotated until the lateral slot engages the vertical post to secure the bracket to the vehicle. Each leg member further includes a lock for securing the arm from relative rotational movement.

13 Claims, 4 Drawing Sheets

(56) References Cited

U.S. PATENT DOCUMENTS

2014/0346307 A1* 11/2014 Tran .................... B60R 13/105
  248/475.1
2015/0353030 A1* 12/2015 Walters ................ B60R 13/105
  248/549

* cited by examiner

NO-DRILL, NO-ADHESIVE LICENSE PLATE MOUNTING BRACKET

CROSS-REFERENCE TO RELATED APPLICATIONS

This application claims the benefit of U.S. Provisional Patent Application 62/725,659, filed on Aug. 31, 2018, and incorporated herein by reference.

STATEMENT REGARDING FEDERALLY SPONSORED RESEARCH AND DEVELOPMENT

Not Applicable.

FIELD OF THE INVENTION

This invention relates to mounting brackets, and more particularly to a mounting bracket for a front license plate frame on a vehicle having front air intake grille.

DISCUSSION OF RELATED ART

More than half of US States require that a front license plate be displayed on every registered motor vehicle. Although not considered a moving violation, the fines associated with failure to display a front license plate can reach in excess of $200.00 per violation. From the factory, the Tesla Model X ships with little more than a plastic bracket that requires drilling directly through the factory bumper.

There are a few "no-drill" license plate mounting solutions currently on the market that are limited to devices that require drilling of some sort, or the application of strips of semi-permanent adhesive. There is, however, another competing device that requires neither drilling nor adhesives. This device relies on a bracket that mounts directly to the plastic air intake grille.

While the solutions that require adhesives or drilling of any kind are problematic in terms of the damage they can cause to the factory body on the vehicle, this air intake grille-mounted prior art product has other flaws which can lead to other long-term damage to the vehicle. One specific product, known commercially as "The Law," attaches directly to the lower plastic front air grille without any apparent drilling or adhesives. The problem with this design is that it places all of the weight of the bracket and attached assemblies directly on the vehicle's delicate plastic grille, which is subject to breakage. With this method of attachment and through normal vehicle vibration and wind force, the plastic grille is now subjected to a tremendous amount of fatigue, for which it was not designed, which often leads to permanent damage and potential failure of the active air vents. Prior art products also block up to 40% of the air intake into the grille, thereby restricting the airflow needed to keep the electronic vehicle drivetrain operating cool and efficiently.

Therefore, there is a need for a device that minimizes the force placed on the grille by transferring these same forces away from the vulnerable area via fulcrum and placing them on the more substantial lower air dam/lower spoiler assembly. Such a needed product would provide for virtually unobstructed airflow into the fresh air intake grille. The present invention accomplishes these objectives.

SUMMARY OF THE INVENTION

The present device is a bracket for holding a license plate to a vehicle, such as the Model X, Model 3, and Model Y automobiles from Tesla. The bracket comprises a frame adapted to receive the license plate with at least two mechanical fasteners. The frame has at least a lower edge, a front surface, and a rear surface. The front surface has at least two apertures therethrough aligned with mounting apertures of the license plate.

At least one leg member is fixed at a top portion thereof with the lower edge of the frame. The at least one leg member terminates at a lower portion thereof in an elongated foot that has a distal end adapted to engage one of the vertical posts of the air intake grille, such as with a longitudinal slot. A lower side of the foot is adapted for resting against the lower surface of the air intake grille, preferably with an elastomeric or otherwise resilient or malleable cushion to inhibit the bracket from damaging the lower surface of the air intake grille. Similarly, the rear surface of the frame may include at least one second cushion to inhibit the bracket from damaging the vehicle.

The at least one leg member further includes an elongated arm that has a proximal end rotatably fixed with the leg member. A distal end of the elongated arm has a lateral slot adapted for receiving one of the vertical posts of the air intake grille therein.

During installation, the foot and the arm of the at least one leg member are inserted into the air intake grille such that the distal end of the foot engages one of the vertical posts of the air intake grille, and the arm thereafter is rotated until the lateral slot engages the vertical post to secure the bracket to the air intake grille of the vehicle.

Preferably the at least one leg member further includes a lock for securing the arm from rotational movement with respect to the leg member. Such a lock may be a mechanical fastener such as a threaded screw, for example, that engages a threaded aperture of the leg member and arm. The proximal end of the arm may include an angled flange that is rotationally fixed with the leg member at a pivot, such as the threaded screw. In such an embodiment, rotating the arm causes the arm to swing through an arc about the axis of the pivot. The threaded screw traverses apertures of the leg member and the flange of the arm to rotationally lock the arm with respect to the leg member.

Preferably the at least one leg member is exactly two leg members, wherein the lateral slots of the arms are mutually opposing. As such, when engaged with different of the vertical posts of the air intake grille, and with the arms rotationally locked to the leg members with the lock, the air intake grille is mechanically captured by the bracket.

The present invention is a device that minimizes the force placed on the grille of the weight and stress impacting a front license plate, by transferring these same forces away from the vulnerable area via fulcrum and placing them on the more substantial lower air dam/lower spoiler assembly. The present invention provides for virtually unobstructed airflow into the fresh air intake grille. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
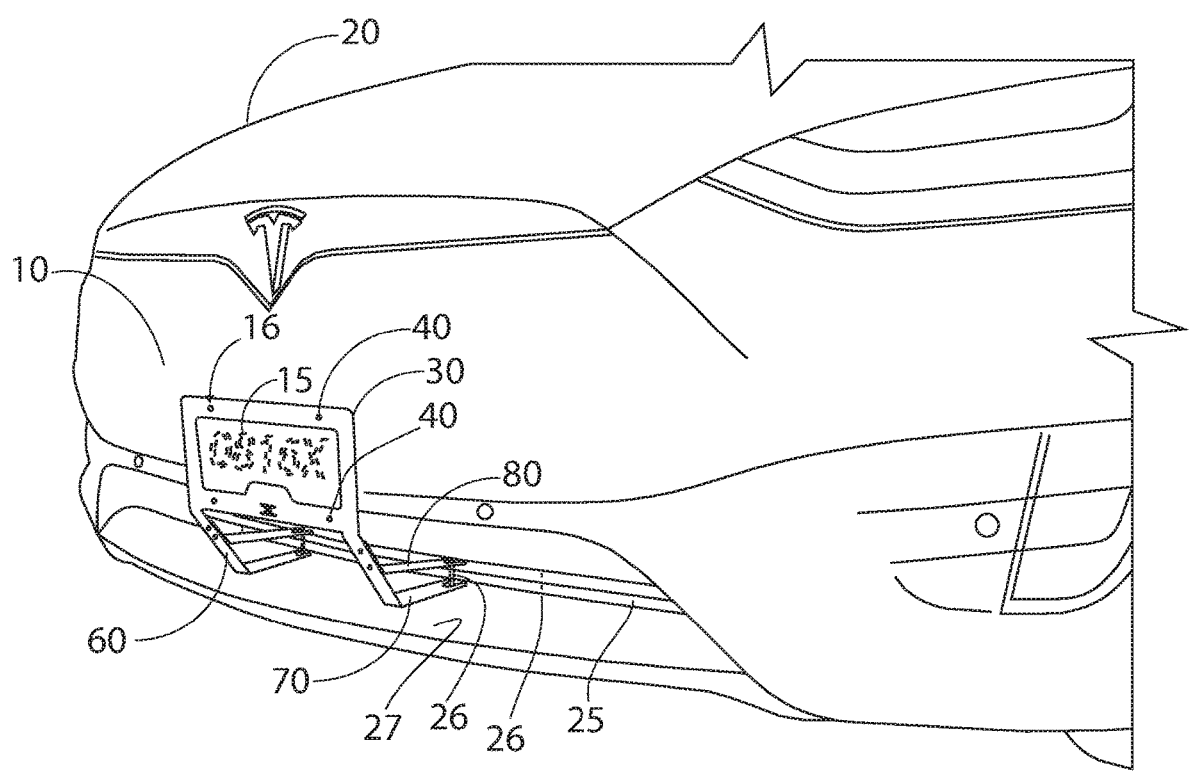
FIG. 1 is a perspective view of the invention and a partial view of a vehicle to which the invention is installed.
Figure 2:
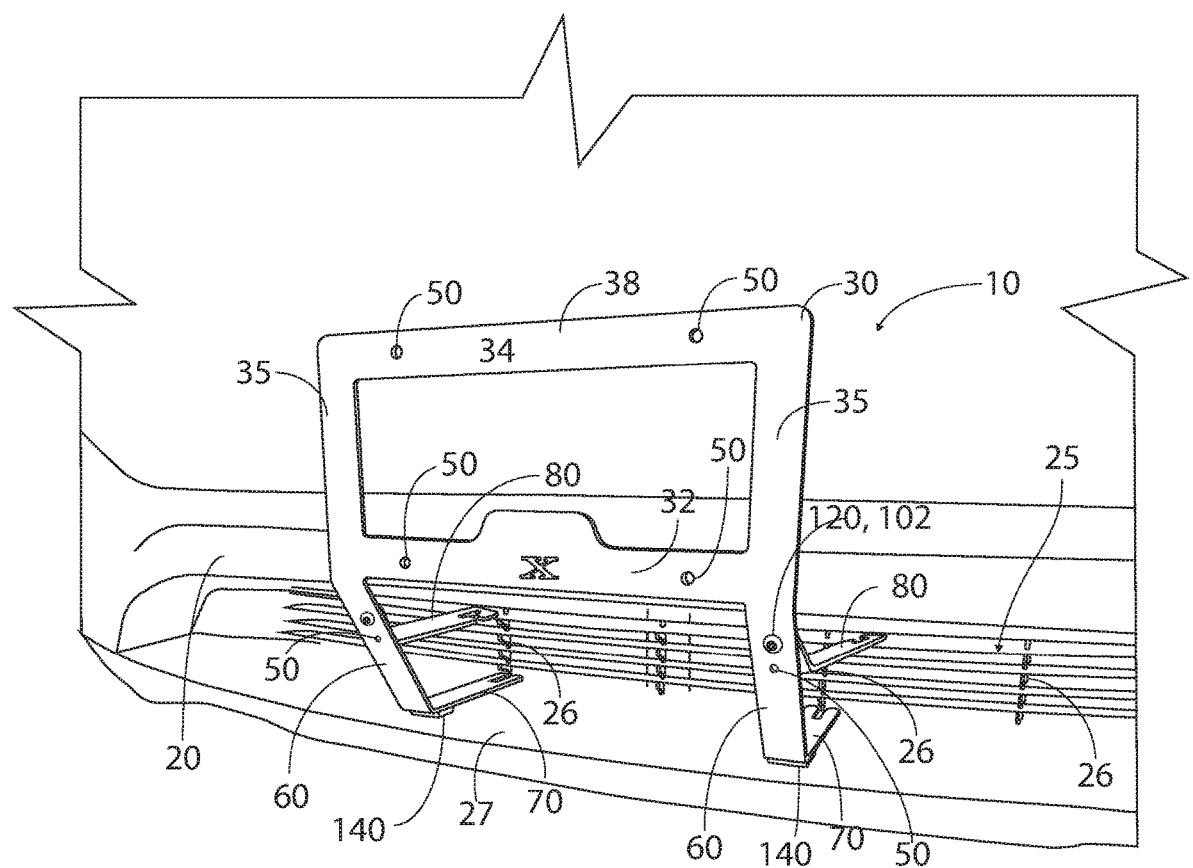
FIG. 2 is an enlarged perspective view of the invention, illustrated as nearly installed on the vehicle.
Figure 3:
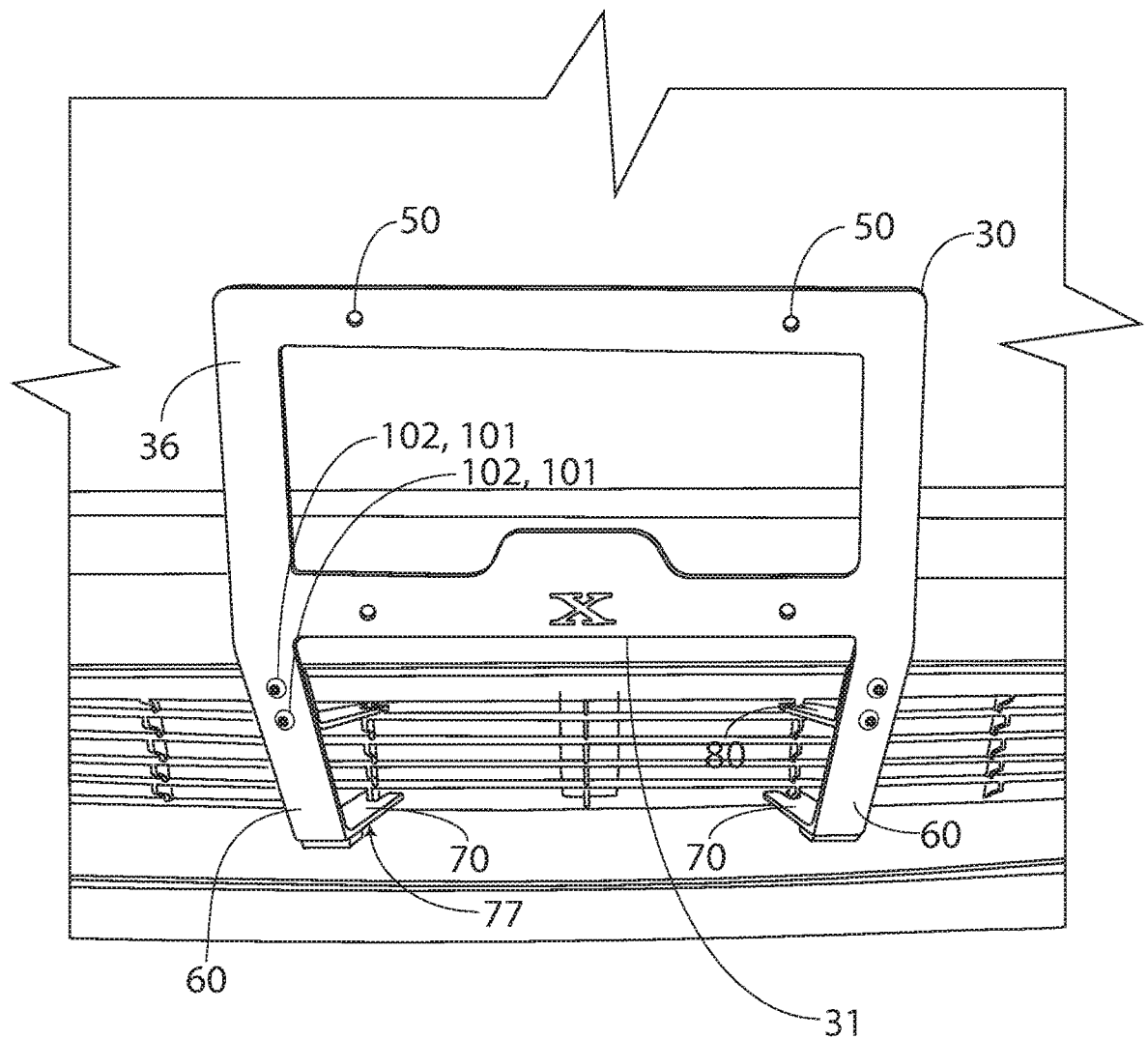
FIG. 3 is an enlarged front elevational view of the invention with a bracket of the present invention installed on the vehicle.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1-4 illustrate a bracket 10 for holding a license plate 15 that has at least two mounting apertures 16 to a vehicle 20 of the type having a forward air intake grille 25 that has a plurality of vertical posts 26 and a lower surface 27. Such a vehicle 20, for example, is the Model X, Model 3, and Model Y automobiles from Tesla.

The bracket 10 comprises a frame 30 adapted to receive the license plate 15 with at least two mechanical fasteners 40, such as screws. The frame 30 has at least a lower edge 31, a front surface 34, and a rear surface 37. The front surface 34 has at least two apertures 50 therethrough aligned with the mounting apertures of the license plate 15. Preferably the frame 30 includes a lower member 32 having the lower edge 31, a pair of side members 35 projecting upwardly form the lower member 32, and an upper member 38 fixed to top ends 36 of each side member 35. The upper member 38 and the lower member 32 each have a pair of the threaded apertures 50 aligned with the mounting apertures 16 of the license plate 15. As such, the license plate 15 may be bolted to the frame 30 with mechanical fasteners 40, such as threaded screws 102.

Figure 4:
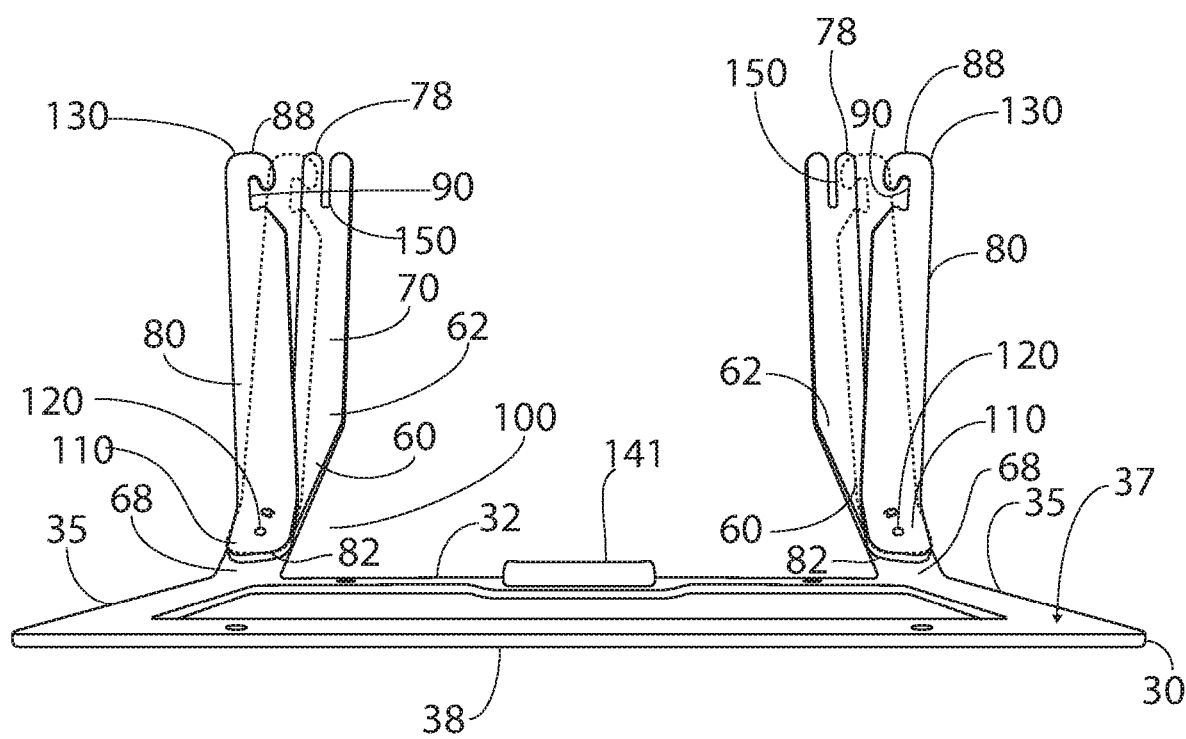
FIG. 4 is a top plan view of the invention.

At least one leg member 60 is fixed at a top portion 68 thereof with the lower edge 31 of the frame 30. The at least one leg member 60 terminates at a lower portion 62 thereof in an elongated foot 70 that has a distal end 78 adapted to engage one of the vertical posts 26 of the air intake grille 25, such as with a longitudinal slot 150 (FIG. 4). A lower side 77 of the foot 70 is adapted for resting against the lower surface 27 of the air intake grille, preferably with an elastomeric or otherwise resilient or malleable cushion 140 (FIG. 2) to inhibit the bracket 10 from damaging the lower surface 27 of the air intake grille 25.

Similarly, the rear surface 37 of the frame 30 may include at least one second cushion 141 to inhibit the bracket 10 from damaging the vehicle 20. Preferably the at least one leg member 60 is integrally formed with the foot 70 from a metallic material such as stainless steel, or similar material.

The at least one leg member 60 further includes an elongated arm 80 that has a proximal end 82 rotatably fixed with the leg member 60. A distal end 88 of the elongated arm 80 has a lateral slot 90 adapted for receiving one of the vertical posts 26 of the air intake grille therein. Preferably the elongated arm 80 is made from the same metallic material as the at least one leg member 60 and foot 70.

During installation, the foot 70 and the arm 80 of the at least one leg member 60 are inserted into the air intake grille 25 such that the distal end 78 of the foot 70 engages one of the vertical posts 26 of the air intake grille 25, and the arm 80 thereafter is rotated until the lateral slot 90 engages the vertical post 26 to secure the bracket 10 to the air intake grille 25 of the vehicle 20.

Preferably the at least one leg member 60 further includes a lock 100 for securing the arm 80 from rotational movement with respect to the leg member 60. Such a lock 100 may be a mechanical fastener 101 such as a threaded screw 102, for example, that engages a threaded aperture 50 of the leg member 60 and arm 80. The proximal end 82 of the arm 80 may include an angled flange 110 that is rotationally fixed with the leg member 60 at a pivot 120, such as the threaded screw 102. In such an embodiment, rotating the arm 80 causes the arm 80 to swing through an arc 130 about the axis of the pivot 120. The threaded screw 102 traverses apertures 50 of the leg member 60 and the flange 110 of the arm 80 to rotationally lock the arm 80 with respect to the leg member 60.

Preferably the at least one leg member 60 is exactly two leg members 60, wherein the lateral slots 90 of the arms 60 are mutually opposing. As such, when engaged with different of the vertical posts 26 of the air intake grille 25, and with the arms 80 rotationally locked to the leg members 60 with the lock 100, the air intake grille 25 is mechanically captured by the bracket 10.

While a particular form of the invention has been illustrated and described, it will be apparent that various modifications can be made without departing from the spirit and scope of the invention. For example, two of the leg members 60 are illustrated in the drawings, but the bracket 10 may include only a single of the leg members 60 that is adapted to engage a central of the vertical posts 26 of the air intake grille 25. Likewise, the bracket 10 has been described as mostly being preferably made from a metallic material such as stainless steel, but other materials such as a strong plastic or even wood might also be used. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A bracket for holding a license plate that has at least two mounting apertures to a vehicle of the type having a forward air intake grille that has a plurality of vertical posts and a lower surface, the bracket comprising:
   a frame adapted to receive thereon the license plate with at least two mechanical fasteners, the frame having at least a lower edge and a front surface, the front surface having at least two apertures therethrough aligned with mounting apertures of the license plate;
   at least one leg member fixed with the lower edge of the frame at a top portion thereof, the at least one leg member terminating at a lower portion thereof in an elongated foot having a distal end adapted to engage one of the vertical posts of the air intake grille, a lower side of the foot adapted for resting against the lower surface of the air intake grille, the at least one leg member further including an elongated arm having a proximal end rotatably fixed with the leg, and a distal end having a lateral slot adapted for receiving one of the vertical posts of the air intake grille therein;
   whereby the foot and arm of the at least one leg member are inserted into the air intake grille such that the distal end of the foot engages one of the vertical posts of the air intake grille, the arm thereafter being rotated until the lateral slot engages the vertical post to secure the bracket to the air intake grille of the vehicle.

2. The bracket of claim 1 wherein the at least one leg member further includes a lock for securing the arm from rotational movement with respect to the leg member.

3. The bracket of claim 2 wherein the lock includes a mechanical fastener that secures the arm to the leg.

4. The bracket of claim 3 wherein the mechanical fastener is a threaded screw.

5. The bracket of claim 4 wherein the proximal end of each arm includes a 90-degree flange that is rotationally fixed with the leg member at a pivot, such that rotating the arm causes the arm to swing through an arc about the axis of the pivot, the threaded screw traversing the leg member and the flange of the arm to rotationally lock the arm in place.

6. The bracket of claim 1 wherein the proximal end of each arm includes a 90-degree flange that is rotationally fixed with the leg member at a pivot, such that rotating the arm causes the arm to swing through an arc about the axis of the pivot.

7. The bracket of claim 6 wherein the pivot is a threaded screw traversing threaded apertures of the leg member and the flange of the arm.

8. The bracket of claim 1 wherein the frame includes a lower member having the lower edge, a pair of side members projecting upwardly from the lower member, and an upper member fixed to top ends of each side member, the upper member and lower member each having a pair of threaded apertures aligned with the mounting apertures of the license plate.

9. The bracket of claim 2 wherein the at least one leg member is exactly two leg members, and wherein the lateral slots of the arms are mutually opposing such that when engaged with different of the vertical posts of the air intake grille, and with the arms rotationally locked to the leg members with the lock, the air intake grille is mechanically captured by the bracket.

10. The bracket of claim 1 wherein the lower side of each foot includes a cushion for inhibiting the bracket from damaging the lower surface of the air intake grille.

11. The bracket of claim 1 wherein a rear surface of the frame includes a cushion for inhibiting the bracket from damaging the vehicle.

12. The bracket of claim 1 wherein the distal end of the foot of the at least one leg member terminates with a longitudinal slot adapted for engaging one of the vertical posts of the air intake grille.

13. A bracket for holding a license plate that has at least two mounting apertures to a vehicle of the type having a forward air intake grille that has a plurality of vertical posts and a lower surface, the bracket comprising:
   a frame adapted to receive thereon the license plate with four mechanical fasteners, the frame having a lower member having the lower edge, a pair of side members projecting upwardly from the lower member, and an upper member fixed to top ends of each side member, the upper member and lower member each having a pair of threaded apertures aligned with the mounting apertures of the license plate, the frame having a front surface and a rear surface;
   two leg members each fixed with the lower edge of the frame at a top portion thereof, each leg member terminating at a lower portion thereof in an elongated foot having a distal end terminating with a longitudinal slot adapted to engage one of the vertical posts of the air intake grille, a lower side of the foot adapted for resting against the lower surface of the air intake grille, each leg member further including an elongated arm having a proximal end rotatably fixed with the leg, and a distal end having a lateral slot adapted for receiving one of the vertical posts of the air intake grille therein;

the proximal end of each arm including a angled flange that is rotationally fixed with the leg member at a threaded screw acting as a pivot when loose, such that rotating the arm causes the arm to swing through an arc about the axis of the pivot, another threaded screw traversing a threaded aperture in each of the leg and the flange for securing the arm against rotational movement with respect to the leg member;

the lower side of each foot including a cushion for inhibiting the bracket from damaging the lower surface of the air intake grille; and a rear surface of the frame including a second cushion for inhibiting the bracket from damaging the vehicle;

whereby the foot and arm of the at least one leg member are inserted into the air intake grille such that the distal end of the foot engages one of the vertical posts of the air intake grille, the arm thereafter being rotated until the lateral slot engages the vertical post to secure the bracket to the air intake grille of the vehicle.

* * * * *